C. H. Guard,
Making Wagon Wheels.
N° 14,337.   Patented Feb. 26, 1856.
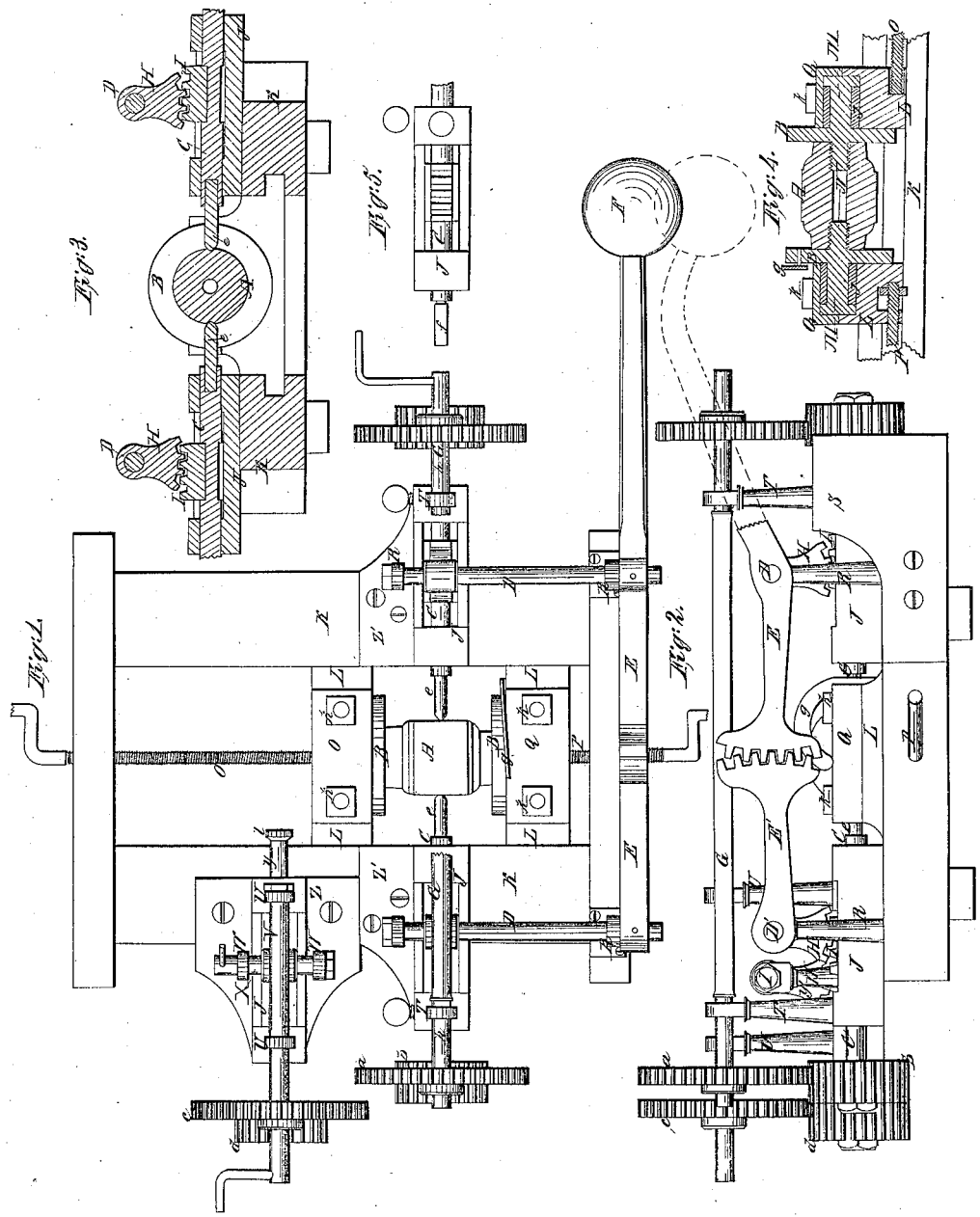

UNITED STATES PATENT OFFICE.

CHAUNCY H. GUARD, OF BROWNVILLE, NEW YORK, ASSIGNOR TO HIMSELF AND JOHN A. SCROGGS.

WHEELWRIGHT-MACHINE.

Specification of Letters Patent No. 14,337, dated February 26, 1856.

*To all whom it may concern:*

Be it known that I, CHAUNCEY H. GUARD, of Brownville, in the county of Jefferson and State of New York, have invented a new and Improved Machine for Making Wagon-Wheels; and I do hereby declare that the following is a full and exact description thereof, reference being had to the accompanying drawings, making a part of this specification, Figure 1 being a top view of said machine; Fig. 2, an end view; Fig. 3, a transverse vertical section in the line *h h* of Fig. 1; Fig. 4, a vertical longitudinal section of a portion of the machine in the line *i i* of Fig. 1, and Fig. 5 a view of a portion of the machine detached.

Similar letters indicate like parts in all the figures.

The hub A, is secured within the machine in such a manner that it can be turned on its axes, or be moved lengthwise to any desired position, and then be firmly secured by means of the combination and arrangement of the holders B, M, N, the bearing-beams L, L, the cap-pieces Q, Q, and the screw-rods O, P, substantially as represented in the drawings and hereinafter set forth.

The holders of the ends of the hub, are composed of the disks B, B, the right and left hand screw shanks N, N, projecting inwardly from said disks, and the outwardly projecting journals M, M, as shown in Fig. 4. The said journals M, M, of the hub holders, rest within the metallic boxes *j, j*, which are fitted into recesses in the bearing beams L, L, and the cap-pieces Q, Q.

Tenons are formed at the ends of the bearing beams L, L, which are received into grooves in the longitudinal beams K, K, of the frame of the machine, as shown in Fig. 3. The screw rod O, which works through a screw nut secured to one end of the machine, extends inward and its inner end passes into an aperture in one of bearing beams L; and the screw rod P, which passes through a screw nut secured to the opposite end of the machine, has its inner end connected to the opposite bearing-beam L. The said screw rods O, P, may have cranks, or their equivalents, combined with their outer ends to enable them to be turned by hand, or by any other means. It will be perceived that by turning the said screw rods O, P, the hub A, may be moved from one end of the frame to the other, or be secured in any intermediate position.

The hub-holders B, M, N, when they are screwed up until the ends of the hub are made to press firmly against the inner sides of the disks B, B, will hold the hub so securely that it cannot be turned in either direction. By unscrewing the nuts *k, k*, which secure the caps Q, Q, to the bearing beams L, L, the hub and its holders can be readily lifted out of the machine.

The holes are bored in the hub, preparatory to making the mortises therein, in the following manner, to wit: The double-headed bearers J, J, which receive the boring and mortising shafts C, C, are secured opposite each other to the side beams of the frame of the machine, in such positions as to bring the said shafts C, C, in a line with each other. Sockets are formed in the inner ends of the said boring and mortising shafts C, C, for the reception of either perforating tools, or chisels; and the outer ends of the said shafts receive the pinions *b, b*.

Between the perforated ends of the bearers J, J, there is an open space, or trough, as shown in the drawings. Concentric recesses are cut into the peripheries of the central portions of the boring and mortising shafts C, C, which recesses receive the toothed saddles I, I, whose sides fit in easily between the connecting sides of the heads of the said bearers, as represented in Fig. 3. Pairs of standards R, R, which rise from the frame of the machine, support the oscillating shafts D, D'; toothed segments H, H, whose teeth match in between the teeth of the toothed saddles I, I, are secured to the said shafts D, D'. Operating levers E, E', of the shape represented in Fig. 2, are secured to the front ends of the said shafts D, D'; the inner ends of the said levers E, E', are connected to each other by means of toothed segment shaped terminations of said levers, whose teeth match into each other; and consequently, the said levers are compelled to vibrate together in such a manner as to impart oscillating movements in opposite directions to the said shafts D, D'. The lever E' does not extend outside of its connection with the shaft D', but the lever E, extends for a considerable distance outside of its shaft D, and has a weight F, attached to its outer extremity.

When boring bits are combined with the inner ends of the boring and mortising shafts C, C, the weight F, on the outwardly projecting end of the lever E, acting through the medium of the lever E', the shafts D, D', the toothed segments H, H, and the toothed saddles I, I, will force inward both the said shafts C, C, with sufficient force to drive the boring bits, when they are rotated, into the hub. The inner ends of the said boring bits are prevented from coming in contact with each other in the center of the hub, by means of the rest S, (Fig. 2,) which prevents the lever E, from descending far enough to enable the inner ends of the bits to be brought in contact with each other. In place of the fixed rest S, a spring may be employed in its place to arrest the lever E, when it has reached the proper point.

The mortising and boring shafts C, C, are simultaneously rotated by means of the connection of their pinions b, b, with the toothed-wheels a, a, on the driving shaft G. The hub is held in any desired position during the operation of boring or mortising, by means of the spring catch, g, and a series of holes in the disk B, of one of the holders. After the preliminary holes have been bored in the hub, in the manner aforesaid, the boring bits e, e, are removed from the inner ends of the shafts C, C, and mortising chisels, f, are secured in their places; the lever E, is then employed for the purpose of imparting the requisite movements to the said mortising chisels. The requisite vibratory movements may be imparted to the lever E, by hand power, or by any other power. The lever E, is enabled to impart reciprocating movements to the shafts C, C, through the medium of the oscillating shafts, D, D', the toothed segments H, H, and the toothed saddles I, I. After the mortises are formed in the hub, the spokes are driven into said mortises, and then the hub and its supporters, are moved lengthwise in the frame until the ends of the spokes are brought opposite the tenoning cutter l, on the shaft Y. While in this position, the tenons are formed upon the ends of the spokes by turning the hub so as to cause the said tenoning cutter to act upon each spoke.

The shaft Y, which carries the tenoning tool l, works in the bearer J', which corresponds in shape with the bearers J, of the boring and mortising shafts C, C; the said shaft Y, is also connected to a short oscillating shaft X, through the medium of a toothed segment Y', descending from the said shaft X, and a toothed saddle resting upon the said shaft Y, which enables the shaft Y, to be moved endwise as it is forming a tenon, while it is rotated by any suitable means. After the tenons have been formed upon the ends of the spokes, the caps Q, Q, are removed, and the hub and its holders are lifted out of the machine. The necessary holes are bored in the sections of the felly for the reception of the spokes, by securing one after the other of the felly sections between the bearing beams L, L, and the caps Q, Q, and then bringing said beams into the proper position to enable a bit combined with one of the shafts C, C, to form the necessary holes in said sections. After the felly sections have been thus bored, the spoked hub, and its holders, may be again placed in their positions within the bearing boxes on the beams L, L, and the felly sections may be then driven on to the ends of the spokes, when the wheel will be ready for ironing.

Having thus fully described my improved machine for making carriage wheels, what I claim therein as new and desire to secure by Letters Patent, is—

The combination of the boring and mortising shafts, C, C, with the levers E, E', through the medium of the toothed saddles I, I, the toothed segments H, H, and the oscillating shafts D, D', or their equivalents, substantially in the manner and for the purpose herein set forth.

CHAUNCY H. GUARD.

Witnesses:
RUSSELL S. TAFT,
A. B. BRADLEY.